United States Patent Office 3,271,442
Patented Sept. 6, 1966

3,271,442
5-ACENAPHTHENYL ESTERS OF CARBAMIC ACID AND N-SUBSTITUTED ALKYL CARBAMIC ACIDS
Joseph A. Lambrech, deceased, late of Charleston, W. Va., by Vallah G. Lambrech, executrix, Charleston, W. Va., assignor to Union Carbide Corporation, a corporation of New York
No Drawing. Original application Aug. 29, 1955, Ser. No. 531,274, now Patent No. 3,084,096, dated Apr. 2, 1963. Divided and this application June 26, 1962, Ser. No. 205,467
2 Claims. (Cl. 260—479)

This application is a division of Serial No. 531,274, filed August 29, 1955, now U.S. Patent 3,084,096.

This invention relates to new chemical compounds and to insecticidal compositions containing them. More particularly, the present invention relates to certain 5-acenaphthenyl esters of N-substituted carbamic acids and to insecticidal compositions containing the same.

The compounds of this invention can be represented by the general formula:

(I) 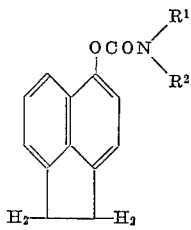

wherein $R^1$ and $R^2$ are individually selected from the class consisting of hydrogen and lower alkyl, with the proviso that the total number of carbon atoms in $R^1$ and $R^2$ does not exceed 7. Compounds wherein one of $R^1$ and $R^2$ is hydrogen are generally superior in insecticidal activity and, hence, preferred.

Exemplary of the compounds represented by Formula I are: 5-acenaphthenyl carbamate, 5-acenaphthenyl N-methyl carbamate, 5-acenaphthenyl N,N-dimethyl carbamate, 5-acenaphthenyl N-ethyl carbamate, 5-acenaphthenyl N-ethyl N-methyl carbamate, 5-acenapthenyl N-n-propyl carbamate, 5-acenaphthenyl N-n-propyl N-methyl carbamate, 5-acenaphthenyl N-isopropyl carbamate, 5-acenaphthenyl N-isopropyl N-methyl carbamate, 5-acenaphthenyl N-n-butyl carbamate, 5-acenaphthenyl N-n-butyl N-methyl carbamate, 5-acenaphthenyl N-isobutyl carbamate, 5-acenaphthenyl N-isobutyl N-methyl carbamate, 5-acenaphthenyl N-pentyl carbamate, 5-acenaphthenyl N-pentyl N-methyl carbamate, 5-acenaphthenyl N-hexyl carbamate, 5-acenaphthenyl N-hexyl N-methyl carbamate, and the like.

The compounds of this invention can be prepared, generally, by reacting 5-acenaphthenol with phosgene to form the corresponding chloroformate and reacting the chloroformate with a primary or secondary amine to form the corresponding carbamate and HCl. If desired, the sodium salt of 5-acenaphthenol may be used, in which case NaCl instead of HCl is a reaction product. In the formation of the chloroformate, the phosgene is dissolved in toluene or benzene or other suitable organic solvent and then added to the water solution of 5-acenaphthenol or its sodium salt at a temperature of from about −30° C. to 20° C. The reaction is slightly exothermic so that some external cooling is usually necessary. The chloroformate separates in the organic phase which is separated from the aqueous phase carrying the hydrogen or sodium chloride. The chloroformate may then either be isolated by distillation or used without further purification.

The reaction involving the addition of the chloroformate to the amine is carried out in the presence of solvents for the amine such as water or dioxane. The reaction temperature is preferably in the range from 10° C. to 50° C. Below 10° C. the reaction proceeds but the rate is too slow and above 50° C. the reaction rate is so rapid that loss of low boiling amines may occur and some decomposition may take place.

For the most part, the products of this invention are crystalline solids which are isolated by filtration or centrifugation and dried. The products are insoluble or only slightly soluble in water and benzene.

The above-described reactions may be represented graphically by the following general equations:

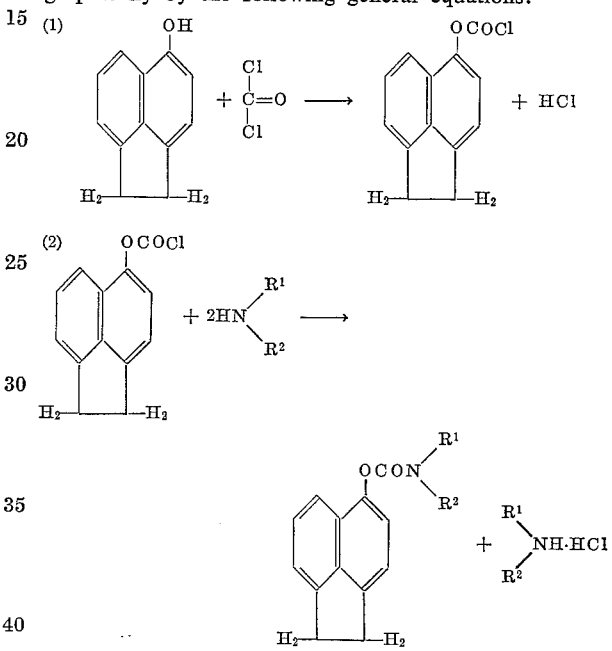

The following example is illustrative.

*Example 1.*—Preparation of 5-acenaphthenyl N-methyl carbamate

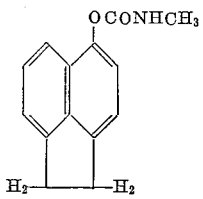

Following the general procedure, 5-acenaphthenyl N-methyl carbamate was prepared by first preparing sodium 5-acenaphthoxide by reacting a mixture of 170 parts of 5-acenaphthenol, 350 parts of water and 44 parts of sodium hydroxide at 90° C. for 2 hours and then cooling to 10° C. A mixture of 150 parts of phosgene and 500 parts of toluene was then added dropwise. After the addition of the phosgene the reaction mixture was agitated at 10° C. to 15° C. for one hour. The organic phase of the reaction mixture was separated from the salt solution and distilled. 5-acenaphthenyl chloroformate boils at 145° C. to 150° C. at 2 mm. Hg. 5-acenaphthenyl N-methyl carbamate was prepared by slowly adding 116 parts of 5-acenaphthenyl chloroformate to a mixture of 62 parts of methylamine and 400 parts of dioxone at 20° C. After the addition of the chloroformate the reaction mixture was agitated at 50° C. for one hour. The solid which separated was filtered, washed with water and dried. 5-acenaphthenyl N-methyl carbamate is a white crystalline solid which melts at 171° C.

As representative of the compounds of this invention, 5-acenaphthenyl N-methyl carbamate was tested as an insecticide by the following test against Mexican bean beetle larvae (*Epilachna varivestis* Muls.). An aqueous suspension of the chemical was prepared at the rate of 0.25 gram of the chemical dissolved in 10 milliliters (10 percent of the final volue of the suspension) of acetone in which was dissolved 0.025 g. (10 percent of the weight of the chemical) of a non-ionic wetting and emulsifying agent which solution was diluted with sufficient water to give 100 ml. of the suspension upon agitation. The specific emulsifier used was "Tergitol Dispersant NPX" a proprietary non-ionic alkyl phenyl polyethylene glycol ether. The suspensions thus prepared and containing 0.25 percent of the chemical were sprayed on the bean plants to run-off, the plants being on a revolving turntable so that all parts of the plants were sprayed. After the plants were dry (about one hour after spraying) each plant was infested with a given number of fourth instar Mexican bean beetle larvae and then the leafy portion of the plant and the larvae were enclosed in a spherical wire mesh cage; and 72 hours after the infestation observations were made of the damage to foilage by the feeding larvae. The compound tested, 5-acenaphthenyl N-methyl carbamate, received a rating of A, showing that it provided excellent control of the insect, i.e. little or no feeding. In tests made on Mexicon bean beetle in a similar manner varying concentrations of the chemical, the amount of toxicant giving a 95 percent kill was found to be 3.8 milligrams of toxicant in 100 milliliters of suspension.

In making the tests previously described it was noted that the sprays were not phytotoxic to the plants at the concentrations of the chemicals used. However, it was desired to test the chemical in the field for phytotoxicity on the representative plants corn, bean, tomato, cabbage and broccoli. For this purpose dusts were prepared containing 2.5 and 5.0 parts of the test chemical in sufficient inert particulate carrier to give 100 parts by weight. The carrier used was a finely divided pyrophyllite as representative of such inert carriers as infusorial earth, clay, talc, pumice, bentonite, diatomaceous earth, cotton seed flour, walnut shell flour and the like. Aqueous suspensions of the test chemical were also prepared from a wettable powder consisting of 25 parts by weight of the test chemical in sufficient inert particulate carrier and wetting agent to give 100 parts by weight. The aqueous suspensions were formulated to contain 4, 2 and 1 pounds of the wettable powder per 100 gallons of water. Three applications of the dust and suspensions of the test chemical were made at approximately 10-day intervals. The dusts were applied so that complete coverage of the foliage was obtained and the aqueous suspensions were sprayed on the plants to run-off. Notations as to phytotoxicity were made seven days after each application of the spray and dust. Slight phytotoxicity was evident to the bean plants treated with the four pound dosage of the test chemical following the third application; lower rates of application to beans showed no phytotoxicity. There was no phytotoxicity at any time to any of the cabbage, broccoli, corn or tomato plants dusted or sprayed with the test chemical.

The toxicants or insecticides contemplated herein, i.e. the compounds of this invention, are not deleteriously affected by suitable adjuvants and additives for instance blood albumin or skimmed milk, nor are the phytotoxic properties of the toxicants affected by such agents; and, as distinguished from rotenone, the properties of the toxicants contemplated herein are not affected by alkaline spray materials such as nicotine, hydrated lime, lime sulfur, Bordeaux mixture nor alkaline dust extenders with all of which materials the toxicants contemplated herein have been found to be compatible. However, the toxicants are preferably not applied to plants in solution in non-volatile solvents, for instance, oils of the type which are, of themselves, phytotoxic although such oil solutions may be used in treating paper, cardboard and the like. It is a feature of the invention that the toxicants contemplated herein are so chemically inert that they do not react with the various agents nor do they react chemically with the foliage or other parts of the plant or seed, either with or without additive agents, in a deleterious manner.

For application to those parts of the plant which are above ground, the toxicants are preferably applied as water base sprays, the sprays containing the toxicants in finely divided condition, this condition easily being obtained by mixing a solution of the toxicant in a water soluble solvent, for instance acetone, into a larger volume of water whereupon the toxicants are thrown out of solution in the finely divided substantially colloidal condition. In the final spray, the acetone is present in only minute amount and that amount quickly volatilizes as the spray dries. Where the toxicants are used as insecticides in grain or seed treatments, they may be applied to the grain or seeds as a dust, preferably with an adhesive adjuvant, merely being tumbled with the seeds or grain. To obtain a dust, either a concentrate or a dilute composition, having the toxicant in extremely finely divided form or a solution of the toxicant in a volatile solvent, may be mixed into a particulate extender, for instance talc or an adhesive adjuvant, and then dried. The volatilization of the solvent deposits the toxicant on the extender in substantially colloidal sized particles. Regrinding may be necessary to obtain correct particle size. Aqueous spray compositions may also be prepared by grinding the toxicants in water to make a concentrated dispersion, or even with so little water as to make a paste which is then incorporated at the point of use with sufficient additional water to give a spray wherein the toxicant has the desired concentration. The concentrates, either in the form of solutions, concentrated aqueous suspensions, pastes or dusts, may contain such other components of the spray as are desirable, for instance nicotine sulfate or other insecticides or fungicides.

The concentrates from which the ultimate aqueous sprays or dusts are to be prepared preferably contain between 10 and 70 parts by weight of the toxicant with sufficient additional material either inert or active (for instance a contact insecticide or a fungicide) to make 100 parts by weight. The ultimate sprays or dusts are prepared by adding a convenient amount of additional material including inert materials and such addends, for instance nicotine sulfate or other insecticide or fungicide, as may be desired in the spray or dust schedule and as the agriculturist is in the habit of using, so that then the crop plants are thoroughly dusted or sprayed, the toxicants herein contemplated are applied at rates of from $\frac{1}{32}$ to 50 lbs. of active toxicant. Whether the toxicants are applied in dust formulations or as aqueous sprays, they are preferably applied in finely divided form. Aqueous sprays prepared by mixing a solution of the toxicants into water are, in general, preferred ts the toxicants precipitate in the water in substantially colloidal form and when such a slurry or suspension is applied to the plant the foliage of the plant is thoroughly but adequately covered with the toxicant and the minute particles of the toxicant firmly lodge in the irregularities of the plant surface so that the toxicant is not dislodged by rain nor the flexing of the plant by wind. Satisfactory sprays for general use contain from about ½ to 4 pounds of the toxicant to be applied per acre.

Emulsifying agents or suspending agents may be used if desired; in general if the spraying device has mechanism for continually agitating the spray compositions, little or no emulsifying agent need be used but where it is desired to maintain the toxicants in suspension for several hours without agitation a higher amount of emulsifying agent is desirable. The amount of emulsifying agent preferably runs from about 1 pound to 10 pounds per 100 pounds of toxicant but desirably as little emulsifying agent is used as is possible consistent with the desired emulsion characteristics of the spray, so that rain does not re-emulsify the toxicant after it is applied to the plant and wash it off of the plant.

For general use the toxicants are applied as homogeneous aqueous dispersions by the use of surface active agents. These agents cause the toxicants easily to be dispersed in water to give the aqueous sprays. The surface active agents employed may be anionic, cationic or nonionic and include, for example, sulfated animal, vegetable and petroleum oils, sodium lauryl sulfate glycerol monostearate, ethylene oxide condensation products with octyl phenol, lauryl pyridinium bromide and cetyldimethylbenzyl ammonium chloride. The surface active agent can comprise from 1 percent to 15 percent by weight of the concentrate.

The insecticides contemplated herein prevent attack by insects upon plants or other material to which the insecticides are applied and they have high residual toxicity. With respect to plants they have a high margin of safety in that, when used in sufficient amount to kill or repel the insects, they do not burn or injure the plant and they resist weathering which includes wash-off caused by rain, decomposition by ultra-violet light, oxidation or hydrolysis in the presence of moisture or, at least, such decomposition, oxidation and hydrolysis as materially decrease the desirable insecticidal characteristics of the toxicants or impart undesirable characteristics, for instance phytotoxicity, to the toxicants. As previously stated the toxicants are so chemically inert that they are compatible with substantially any other constituents of the spray schedule. The low water solubility of the toxicants enable them to be used in the soil upon seeds or the roots of the plants without injuring either the seeds, roots or plants by imbibition or root-uptake and they have such low mammalian toxicity that when applied to either the foliage of a plant or the parts of a plant which are below the surface of the soil, for instance tubers and the like, either humans or animals consuming the plants are not injured although, with respect to insects, they kill where the insects imbibe them either through food or, as in the case of the mosquito larvae, through imbibition from the environment.

Apart from the distinctive insecticidal properties of the materials herein disclosed, adapting them for agricultural use, the materials generally may be used as modifiers for resin manufacture and they may find applications in the pharmaceutical arts either as drugs, intermediates or as chemotherapeutants.

What is claimed is:
1. Compounds of the formula wherein $R^1$ and $R^2$ are individually selected from the class consisting of hydrogen and lower alkyl, with the proviso that the total number of carbon atoms in $R^1$ and $R^2$ does not exceed 7.

2. 5-acenaphthenyl N-methyl carbamate.

References Cited by the Examiner
UNITED STATES PATENTS

| | | | |
|---|---|---|---|
| 2,776,197 | 1/1957 | Gysin et al. | 71—2.4 |
| 2,903,478 | 9/1959 | Lambrech | 260—479 |
| 2,935,442 | 5/1960 | Lamb | 167—32 |
| 2,935,443 | 5/1960 | Lamb | 167—32 |
| 2,995,598 | 8/1961 | Bauer | 260—479 |
| 3,027,298 | 3/1962 | Huisman et al. | 167—32 |
| 3,081,340 | 3/1963 | Kilsheimer et al. | 260—479 |
| 3,084,096 | 4/1963 | Lambrech | 167—30 |
| 3,165,442 | 1/1965 | Kilsheimer et al. | 167—32 |

OTHER REFERENCES

Braun et al., Berichte der Deutschen Chemischen Gesellschaft, vol. 59B, pp. 920–923 (1926).

LORRAINE A. WEINBERGER, *Primary Examiner.*

JULIAN S. LEVITT, *Examiner.*

I. PELLMAN, *Assistant Examiner.*